US012608243B2

(12) United States Patent
Wang et al.

(10) Patent No.: US 12,608,243 B2
(45) Date of Patent: Apr. 21, 2026

(54) DYNAMIC LOAD BALANCING IN NETWORK INTERFACE CARDS FOR OPTIMAL SYSTEM LEVEL PERFORMANCE

(71) Applicant: Intel Corporation, Santa Clara, CA (US)

(72) Inventors: Ren Wang, Portland, OR (US); Daniel P. Daly, Santa Barbara, CA (US); Antoine Kaufmann, Hillsboro, OR (US); Saikrishna Edupuganti, Hillsboro, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 17/152,573

(22) Filed: Jan. 19, 2021

(65) Prior Publication Data

US 2021/0141676 A1     May 13, 2021

Related U.S. Application Data

(63) Continuation of application No. 15/476,379, filed on Mar. 31, 2017, now abandoned.

(51) Int. Cl.
*G06F 9/50* (2006.01)
*G06F 11/30* (2006.01)
*G06F 11/34* (2006.01)

(52) U.S. Cl.
CPC ........ *G06F 9/5083* (2013.01); *G06F 11/3024* (2013.01); *G06F 11/3433* (2013.01)

(58) Field of Classification Search
None
See application file for complete search history.

(56) References Cited

U.S. PATENT DOCUMENTS

| | | | | | |
|---|---|---|---|---|---|
| 6,760,775 | B1 * | 7/2004 | Anerousis | ............... | H04L 61/00 |
| | | | | | 709/229 |
| 7,443,878 | B2 | 10/2008 | Hendel et al. | | |
| 8,478,877 | B2 | 7/2013 | Droux et al. | | |
| 8,762,534 | B1 | 6/2014 | Hong et al. | | |

(Continued)

FOREIGN PATENT DOCUMENTS

| | | | |
|---|---|---|---|
| CN | 105900063 | A | 8/2016 |
| CN | 106506393 | A | 3/2017 |

(Continued)

OTHER PUBLICATIONS

Final Office Action for U.S. Appl. No. 15/476,379, Mailed Oct. 20, 2020, 13 pages.

(Continued)

*Primary Examiner* — Wynuel S Aquino
(74) *Attorney, Agent, or Firm* — Essential Patents Group, LLP; Christopher K. Gagne

(57) ABSTRACT

A network interface card (NIC) can be configured to monitor a first central processing unit (CPU) core mapped to a first receive queue having a receive queue length. The NIC can also be configured to determine whether the CPU core is overloaded based on the receive queue length. The NIC can also be configured to redirect data packets that were targeted from the first receive queue to the CPU core to another CPU core responsive to a determination that the CPU core is overloaded.

27 Claims, 5 Drawing Sheets

(56) References Cited

U.S. PATENT DOCUMENTS

| | | | | |
|---|---|---|---|---|
| 9,178,815 | B2 | 11/2015 | Gasparakis et al. | |
| 9,178,839 | B2 | 11/2015 | Cardona et al. | |
| 9,602,437 | B1* | 3/2017 | Bernath | H04L 49/9084 |
| 10,050,884 | B1* | 8/2018 | Dhanabalan | H04L 43/0864 |
| 2005/0033809 | A1 | 2/2005 | McCarthy et al. | |
| 2005/0129046 | A1* | 6/2005 | Kumar | H04L 49/90 |
| | | | | 370/428 |
| 2008/0181245 | A1* | 7/2008 | Basso | H04L 47/50 |
| | | | | 370/412 |
| 2008/0263171 | A1 | 10/2008 | Craft et al. | |
| 2011/0023042 | A1 | 1/2011 | Pope et al. | |
| 2011/0142064 | A1* | 6/2011 | Dubal | H04L 47/125 |
| | | | | 370/412 |
| 2012/0127860 | A1* | 5/2012 | Arumilli | H04L 47/6215 |
| | | | | 370/235 |
| 2014/0161122 | A1 | 6/2014 | Vasudevan | |
| 2014/0280709 | A1* | 9/2014 | Li | G06F 13/385 |
| | | | | 709/217 |
| 2014/0301388 | A1* | 10/2014 | Jagadish | H04L 67/563 |
| | | | | 370/389 |
| 2015/0016266 | A1* | 1/2015 | Dumitrescu | H04L 47/6275 |
| | | | | 370/236 |
| 2015/0067229 | A1 | 3/2015 | Connor et al. | |
| 2016/0062802 | A1 | 3/2016 | Guan et al. | |
| 2016/0070598 | A1 | 3/2016 | Vadkerti et al. | |
| 2016/0127276 | A1* | 5/2016 | Wu | H04L 43/12 |
| | | | | 709/224 |
| 2016/0156462 | A1 | 6/2016 | Winslow et al. | |
| 2016/0182380 | A1 | 6/2016 | Mehra et al. | |
| 2016/0285971 | A1 | 9/2016 | Bilas et al. | |
| 2016/0378565 | A1* | 12/2016 | Che | G06F 9/5083 |
| | | | | 718/105 |
| 2017/0132302 | A1* | 5/2017 | Johny | G06F 16/27 |
| 2017/0230451 | A1 | 8/2017 | Paramasivam | |
| 2018/0131620 | A1* | 5/2018 | Su | H04L 47/2441 |
| 2018/0210524 | A1* | 7/2018 | Koenen | H04L 12/10 |
| 2018/0270347 | A1 | 9/2018 | Rangarajan et al. | |
| 2018/0367460 | A1 | 12/2018 | Gao et al. | |

FOREIGN PATENT DOCUMENTS

| | | |
|---|---|---|
| CN | 106527653 A | 3/2017 |
| WO | 2017014758 A1 | 1/2017 |

OTHER PUBLICATIONS

First Office Action for U.S. Appl. No. 15/476,379, Mailed Apr. 30, 2020, 12 pages.

Herbert, Thomas and deBruijn, Willem, "Scaling in the Linux Networking Stack," The Linux Kernel, URL https://www. kernel. org/doc/Documentation/networking/scaling. txt (2011), 10 pages.

Intel Corporation, "Intel 82599 10 Gigabit Ethernet Controller Datasheet," LAN Access Division, Revision 2.74, Feb. 2012, 930 pages.

Intel Corporation, "Intel Ethernet Flow Director and Memcached Performance," White Paper, published Oct. 13, 2014, 6 pages.

Kaufmann, Antoine, Peter, Simon, Anderson, Thomas, Krishnamurthy, "FlexNIC: Rethinking Network DMA," HotOS XV, Kartause Ittingen, Switzerland, May 18-20, 2015, 7 pages.

Lim, Hyeontaek, Han, Dongsu, Andersen, David G., Kaminsky, Michael, "Mica: A Holistic Approach to Fast In-Memory Key-Value Storage," Included in the proceedings of the 11th USENIX Symposium on Networked Systems Design and Implementation, Seattle, WA Apr. 2-4, 2014, 17 pages.

First Chinese Office Action of P.R. China State Intellectual Property Office for Patent Application No. 201810213728.0, Mailed Dec. 14, 2023, 10 pages.

Office Action from Chinese Patent Application No. 201810213728.0 notified May 8, 2024, 14 pgs.

Office Action from Chinese Patent Application No. 201810213728.0 notified Jul. 30, 2024, 14 pgs.

Office Action from Chinese Patent Application No. 201810213728.0 notified Oct. 29, 2024, 14 pgs.

* cited by examiner

200

205

INCOMING DATA PACKETS

210

COMPUTING DEVICE

216

NETWORK INTERFACE CONTROLLER

217

RECEIVE QUEUE 1

218

RECEIVE QUEUE n

230

CORE 1

231

CORE n

300

302     MONITOR CPU CORE

NO

304
IS CPU CORE
OVERLOADED?

YES

306     REDIRECT DATA PACKETS TO
OTHER CPU CORE

400

402  MONITOR RECEIVE QUEUE LENGTH

404
QUEUE LENGTH
GREATER THAN FIRST
THRESHOLD?

NO

YES

406  REDIRECT DATA PACKETS TO
OTHER CPU CORE

408
QUEUE LENGTH
GREATER THAN
SECOND
THRESHOLD?

NO

YES

410  REDIRECT DATA PACKETS TO
OTHER CPU CORE(S)
PROBABILISTICALLY

DYNAMIC LOAD BALANCING IN NETWORK INTERFACE CARDS FOR OPTIMAL SYSTEM LEVEL PERFORMANCE

TECHNICAL FIELD

The disclosed technology relates generally to network interface cards (NICs), also referred to herein as host fabric interfaces (HFIs), central processing unit (CPU) cores, and CPU core load distribution management.

BACKGROUND

FIG. 1 is a functional block diagram illustrating an example of a system 100 that includes a computing device 110, such as a network appliance. In the example, the computing device 110 includes a central processing unit (CPU) 112 for executing instructions as well as a memory 114 for storing such instructions. The CPU 112 has n CPU cores. As used herein, the term core generally refers to a basic computation unit of the CPU. The memory 114 may include random access memory (RAM), flash memory, hard disks, solid state disks, optical disks, or any suitable combination thereof.

The computing device 110 also includes a network interface card (NIC) 116 for enabling the computing device 110 to communicate with at least one other computing device 120, such as an external or otherwise remote device, by way of a communication medium such as a wired or wireless packet network, for example. The computing device 110 may thus transmit data to and/or receive data from the other computing device(s) by way of its NIC 116. For example, the NIC 116 has n receive queues for receiving data, e.g., ingress packets, from the other computing device(s).

Generally, NICs can steer data flows, e.g., data packets, to any of a number of receive queues by way of Receive Side Scaling (RSS) or implementation of a flow director. Servers generally take advantage of such capabilities to distribute connections, e.g., transmission control protocol (TCP) connections, to different CPU cores for processing.

The use of RSS typically includes application of a filter that applies a hash function over the packet headers of received data packets. An indirection table can then be used to map each data packet to a certain receive queue, e.g., based on the corresponding hash value. The CPU cores can then be assigned to work on one or more specific queues in order to enable distributed processing.

Because RSS usually involves the mapping of many data flows into a limited number of receive queues targeting a limited number of CPU cores, there is typically a high likelihood of data traffic imbalance, in which one or more CPU cores are disadvantageously required to handle a higher amount of data traffic. While such CPU cores struggle to keep up with the incoming data packets, other CPU cores remain relatively idle. Such situations are inefficient and not optimal for system-wide performance.

BRIEF DESCRIPTION OF THE DRAWINGS

The concepts described herein are illustrated by way of example and not by way of limitation in the accompanying figures. For simplicity and clarity of illustration, elements illustrated in the figures are not drawn to scale unless otherwise noted.

DETAILED DESCRIPTION OF THE DRAWINGS

Figure 1:
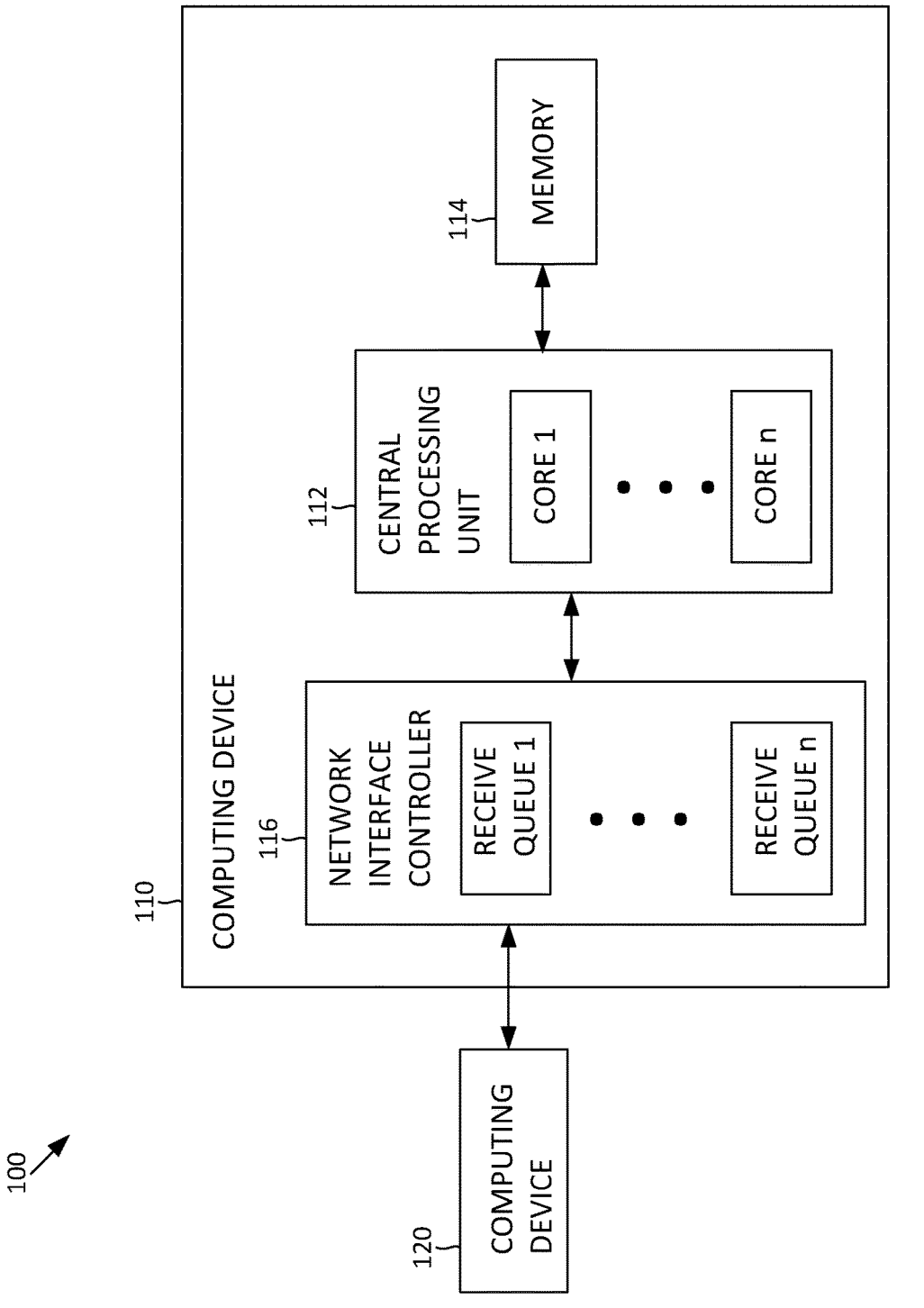
FIG. 1 is a functional block diagram illustrating an example of a system having a computing device that includes a central processing unit (CPU), a memory, and a network interface card (NIC).

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, such feature, structure, or characteristic can be employed in connection with another disclosed embodiment whether or not such feature is explicitly described in conjunction with such other disclosed embodiment.

The disclosed embodiments may be implemented, in some cases, in hardware, firmware, software, or any combination thereof. The disclosed embodiments may also be implemented as instructions (e.g. a computer program product) carried by or stored on one or more transitory or non-transitory machine-readable (e.g., computer-readable) storage mediums, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Embodiments of the disclosed technology generally pertain to network interface card (NIC)-based adaptive techniques for performing dynamic load distribution among multiple CPU cores. In such embodiments, the NIC can effectively and dynamically load-balance incoming data traffic and consequently optimize the full-system performance. Indeed, significant improvement may be realized in network processing performance with many workloads without requiring software support.

Embodiments can address both connection-oriented and connectionless data traffic. Such dynamic load balancing in a NIC generally includes detecting whether one or more of the CPU cores are overloaded. Such detection can be done, for example, by measuring CPU core responsiveness speed in real-time using one or more metrics such as receive queue length. If a determination is made that a certain CPU core is overloaded, a portion of data packets that were originally targeted or otherwise mapped to the CPU core can be directed elsewhere. For example, the data packets can be redirected to a relatively idle CPU core.

Figure 2:
FIG. 2 is a functional block diagram illustrating a first example of a system having a computing device that includes a network interface card (NIC) and at least one central processing unit (CPU) core in accordance with certain embodiments of the disclosed technology.

FIG. 2 is a functional block diagram illustrating a first example of a system 200 having a computing device 210 that includes a network interface card (NIC) 216, such as an Ethernet card, and at least one central processing unit (CPU) core 230 in accordance with certain embodiments of the disclosed technology. It should be noted that, as used herein, the terms NIC and host fabric interface (HFI) are interchangeable.

In the example, the NIC 216 has n receive queues, such as registers or other suitable data storage components, for receiving data packets from other computing devices. A first receive queue 217 of the NIC 216 may receive one or more incoming data packets 205, e.g., from a separate computing device over a wired or wireless connection.

Each of the n receive queues of the NIC 216 may be mapped to one or more CPU cores. This mapping may be re-configurable, e.g., depending on the hardware specifications and/or other details of the particular implementation. In the example, data packets sent to the first receive queue 217 and the nth receive queue 218 are mapped to a first CPU core 230.

Responsive to a determination that the first CPU core 230 is overloaded, e.g., the lengths of either or both of the first and nth receive queues 217 and 218 exceed a certain threshold, the data packets from either or both of the first and nth receive queues 217 and 218 may be redirected, e.g., re-mapped to, another CPU core such as the nth CPU core 231. The CPU core to which the data packets are redirected may be selected based on a determination that the CPU core is less busy than the first CPU core 230.

Certain embodiments may include an NIC-based load balancer configured to handle different run-time situations during redirection. For example, with regard to situations involving TCP connections, SYN packets (which typically mark the beginning of a new data flow) may be identified and steered to a lightly loaded CPU core when the system determines that the CPU core handling the data traffic is over-loaded. A flow director may implement an exact match rule identifying this data flow along with an action to redirect the packets to the CPU core having a lighter load. This advantageously maintains the data flow affinity for subsequent data packets belonging to this flow. Also, existing connections may continue to be served by their original CPU core choices.

With regard to situations involving connection-less workloads, such as those involving key-value store (KVS) (e.g., memcached), for example, a portion of the key may be used to direct data packets to a lookup CPU core to minimize cross-core snoop and also maximize the system performance generally, because the same key typically directs to the same CPU core for the lookup. Embodiments may cause data packet redirection to happen immediately once CPU core congestion is detected by modifying an RSS indirection table to point some hash values to receive queues that are serviced CPU cores having a lighter load.

Current load balancing techniques are generally performed at a dedicated appliance or a server in front of multiple servers, which may work at the node level but not at the CPU core level. While other techniques can be implemented in software, such as Receive Packet Steering (RPS, a software implementation of RSS), and can be used in conjunction with utilities that help monitor CPU load, e.g., mpstat, such techniques disadvantageously result in extra latency and also occupy valuable CPU cycles for the load balancing tasks. In contrast, embodiments of the disclosed technology advantageously enable an NIC to transparently balance the load in real time, without software interference in the critical path.

Embodiments generally include use of an NIC's capability to steer data packets/flows to different receive queues to be processed by different CPU cores, advantageously resulting in improvements in latency, such as avoiding core-core transferring for TCP connections, and also increased data throughput. In certain situations, dynamic load balancing may need to be enforced to change the mapping of data packets to CPU cores.

In certain embodiments, RSS may be used to perform a hash function on the data packet header and map data flows to different receive queues assigned to different CPU cores using a corresponding indirection table. Multiple data queues can mapped to the same CPU core, and this can be configured by a user.

Other embodiments may include a flow director having programmable filters that can be used to identify specific data flows or sets of data flows based on an exact match of a portion of data packets, for example, and then route the data packet(s) to specific receives queues, e.g., mapped to specific CPU cores.

Figure 3:
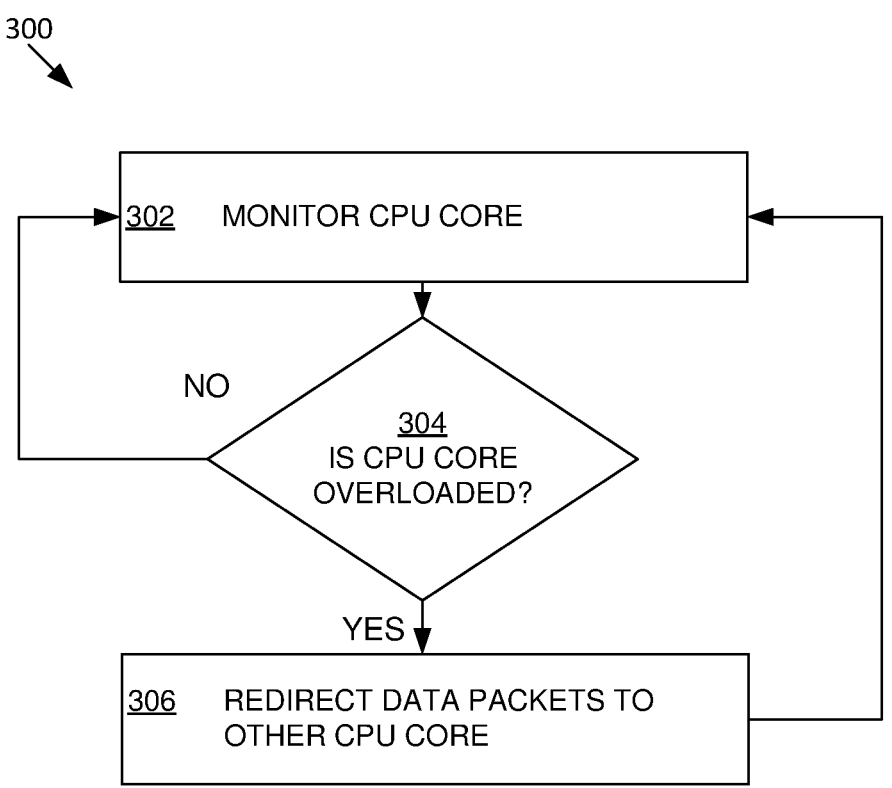
FIG. 3 is a flow diagram illustrating an example of a computer-implemented method of performing CPU core load balancing in accordance with certain embodiments of the disclosed technology.

FIG. 3 is a flow diagram illustrating an example of a computer-implemented method 300 of performing CPU core load balancing in accordance with certain embodiments of the disclosed technology. At block 302, a particular CPU core is monitored by the NIC. For example, the NIC may monitor the queue length for a receive queue that is mapped to the CPU core. The queue length for the receive queue may include a quantified measure of how many computing tasks for the receive queue are lined up at that particular moment, e.g., the number of outstanding receive packets, e.g., data packets, that have not yet been processed by the corresponding CPU core.

At block 304, a determination is made as to whether the CPU core is overloaded. Such determination may be made by the NIC at least in part based on the receive queue length, for example. Responsive to a determination that the CPU core is overloaded, e.g., that the receive queue length is too large, data packets that had been targeted to the CPU core may be redirected to a different CPU core, as indicated at block 306, and processing may return to block 302; otherwise, processing simply proceeds directly back to block 302.

It will be appreciated that subsequent performance of the process 300 beginning at block 302 may be done continuously, on a periodic basis, or responsive to a certain event such as a user request, for example. It will also be appreciated that the CPU cores may be part of the same CPU or separate CPUs.

There are a number of situations in which current attempts at RSS-based load balancing fail to meet performance requirements, such as situations in which TCP flows overload a certain CPU core. With RSS, data packet headers having a certain hash value can be mapped to a certain CPU core based on the corresponding indirection table. If a certain CPU core is handling a few large TCP flows, or temporarily gets too many flows mapped to it, that CPU core becomes overloaded. In such situations, new data flows may be re-assigned to CPU cores that have a lighter load, for example.

In situations involving KVS-type workloads, object-level affinity generally results in distributing requests to corresponding CPU cores based on the application's partitions, e.g., key space partitioning. Requests having the same key (or same region of keys) may be sent to the same CPU core for processing, thus significantly reducing cross-core communication overhead and improving performance, often significantly.

In order to perform dynamic load balancing, overloading of a CPU core must be detected. This may be accomplished by enabling the CPU cores to communicate with the NIC, e.g., using out-of-band messaging, about their utilization. Alternatively, the NIC may observe the receive queue length to a certain CPU core. If the NIC determines that a certain receive queue length exceeds a particular threshold, it may determine that overloading is occurring and subsequently steer data traffic to the CPU core elsewhere.

As used herein, the term receive queue length generally refers to a quantified measure of how many computing tasks for a certain receive queue are awaiting processing by the NIC at a particular moment, e.g., the number of outstanding receive packets, such as data packets, that have not yet been processed by a corresponding CPU core.

Figure 4:
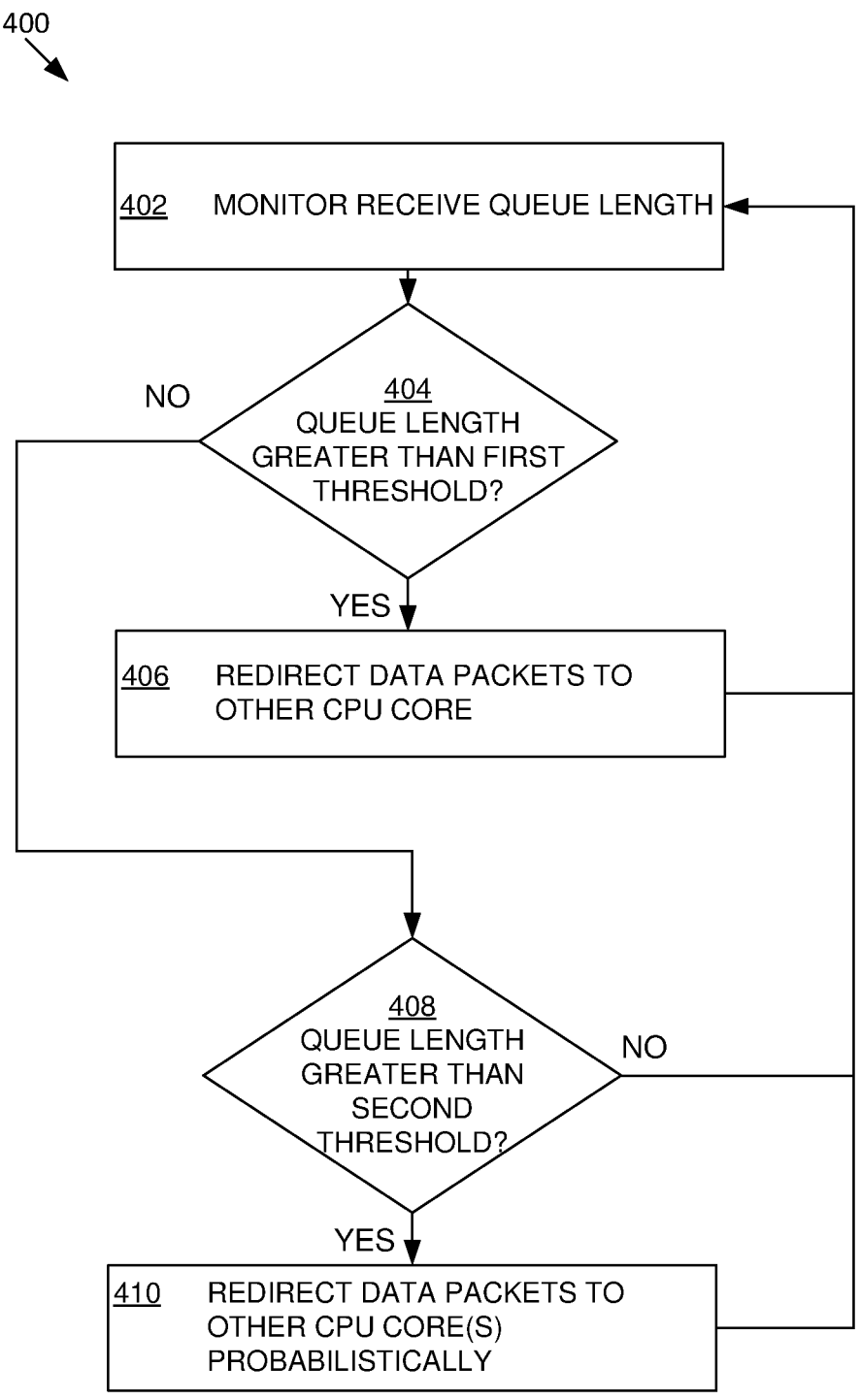
FIG. 4 is a flow diagram illustrating another example of a computer-implemented method of performing CPU core load balancing in accordance with certain embodiments of the disclosed technology.

FIG. 4 is a flow diagram illustrating another example of a computer-implemented method 400 of performing load balancing in accordance with certain embodiments of the disclosed technology. At block 402, the queue length for a particular receive queue, e.g., a receive queue of a NIC, that is mapped to a certain CPU core is monitored by the NIC.

At block 404, a determination is made as to whether the receive queue length exceeds a first threshold. Responsive to a determination that the receive queue length does exceed the first threshold, data packets that had been targeted to the CPU core may be redirected to a different CPU core, as indicated at block 406, and processing may return to block 402; otherwise, processing proceeds to block 408.

At block 408, a determination is made as to whether the receive queue length exceeds a second threshold. Responsive to a determination that the receive queue length does exceed the second threshold, data packets that had been targeted to the CPU core may be redirected to a different CPU core probabilistically, as indicated at block 410, and processing may return to block 402; otherwise, processing simply returns to block 402.

In situations where the receive queue length exceeds the second threshold but not the first threshold, a determination may be made as to how close the receive queue length is to the first threshold, how quickly the receive queue length is approaching—or moving away from—the first threshold, the queue length of other receive queues that are mapped to the CPU core, or any combination thereof.

Figure 5:
FIG. 5 illustrates an example of multiple receive queue thresholds in accordance with certain embodiments of the disclosed technology.
Figure 5:
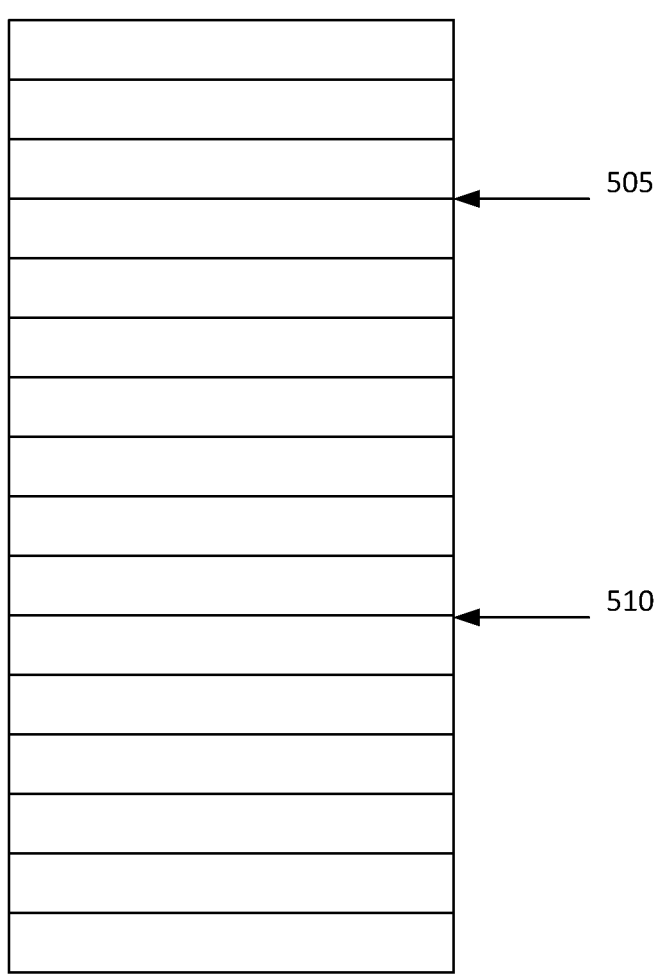

FIG. 5 illustrates an example 500 of multiple receive queue thresholds in accordance with certain embodiments of the disclosed technology. The example 500 includes a first threshold 505 and a second threshold 510, such as the first and second thresholds discussed above in connection with FIG. 4, for example.

In situations involving TCP connections, data packets belonging to the same connection are generally not sent to different CPU cores. Thus, when a CPU core is determined to be overloaded, the NIC may identify SYN packets and re-steer new data flows to other CPU cores. In such embodiments, the flow director may have filters placed earlier in the receive path of the NIC and the target flow may be added into the flow director to steer subsequent data packets of that flow to a relatively idle CPU core. Subsequently, when a new data packet comes in, the NIC may first perform a match against the flow director filters and, if there is a match, the data packet may be steered to its newly selected CPU core; otherwise, the data packet may continue to the RSS indirection table, e.g., by default.

For KVS workloads (e.g., memcached), the data can be partitioned, e.g., sharded, such that each CPU core can exclusively access its own partition in parallel processing without inter-core communication. Object-level core affinity generally involves distribution of requests to CPU cores based on the application's partitioning. For example, requests sharing the same key would all go to the CPU core handling that key's partition. Embodiments can include detecting the overloaded CPU core by monitoring the receive queue length, and re-configuring the RSS indirection table such that the congested CPU core is mapped to fewer queues.

EXAMPLES

Illustrative examples of the technologies disclosed herein are provided below. An embodiment of the technologies may include any one or more, and any combination of, the examples described below.

Example 1 includes a network interface card (NIC) configured to monitor a first central processing unit (CPU) core mapped to a first receive queue having a receive queue length; determine whether the CPU core is overloaded based at least in part on the receive queue length; and, responsive to a determination that the CPU core is overloaded, redirect data packets that were targeted from the first receive queue to the first CPU core to a second CPU core.

Example 2 includes the subject matter of Example 1, the NIC further configured to determine that the second CPU core has a lighter load than the first CPU core.

Example 3 includes the subject matter of any of Examples 1-2, and wherein determining whether the CPU core is overloaded includes determining whether the receive queue length exceeds a first threshold, further wherein the determination that the CPU core is overloaded is based at least in part on a determination that the receive queue length does exceed the first threshold.

Example 4 includes the subject matter of any of Examples 1-3, and wherein determining whether the CPU core is overloaded further includes, responsive to a determination that the receive queue length does not exceed the first threshold, determining whether the receive queue length exceeds a second threshold, further wherein the determination that the CPU core is overloaded is based at least in part on a determination that the receive queue length does exceed the second threshold.

Example 5 includes the subject matter of Example 4, and wherein the redirecting is performed probabilistically.

Example 6 includes the subject matter of any of Examples 1-5, and wherein the redirecting includes the NIC identifying SYN packets and re-steering new data flows to at least the second CPU core.

Example 7 includes the subject matter of any of Examples 1-6, the NIC further configured to repeat the monitoring and determining continuously.

Example 8 includes the subject matter of Example 7, the NIC further configured to repeat the receiving and determining at a specified time interval.

Example 9 includes the subject matter of any of Examples 1-8, and wherein the NIC is an Ethernet card.

Example 10 includes a system comprising: a network interface card (NIC) of a first computing device, the MC having a first receive queue; a first central processing unit (CPU) core of the first computing device, the first CPU core being mapped to the first receive queue; and hardware configured to determine, based at least in part on a receive queue length of the receive queue, whether the first CPU core is overloaded.

Example 11 includes the subject matter of Example 10, the system further comprising a second CPU core having a lighter load than the first CPU core.

Example 12 includes the subject matter of any of Examples 10-11, and wherein the hardware is further configured to cause data packets that were targeted for the first CPU core to be redirected to the second CPU core.

Example 13 includes the subject matter of any of Examples 10-12, and wherein the hardware is configured to determine whether the first CPU core is overloaded by determining that a receive queue length of the first receive queue exceeds a first threshold.

Example 14 includes the subject matter of any of Examples 10-13, and wherein the hardware is configured to determine whether the first CPU core is overloaded by determining that the receive queue length of the first receive queue does not exceed the first threshold but does exceed a second threshold.

Example 15 includes the subject matter of any of Examples 10-14, and wherein the NIC is an Ethernet card.

Example 16 includes one or more non-transitory, computer-readable media comprising instructions that, when executed by a processor, cause the processor to perform operations pertaining to load balancing in a network interface card (NIC), the operations comprising: monitoring a first central processing unit (CPU) core of the NIC, wherein the first CPU core is mapped to a first receive queue having a receive queue length; determining whether the CPU core is overloaded based at least in part on the receive queue length; and responsive to a determination that the CPU core is overloaded, redirecting data packets that were targeted from the first receive queue to the first CPU core to a second CPU core.

Example 17 includes the subject matter of Example 16, and wherein the operations further comprise determining that the second CPU core has a lighter load than the first CPU core.

Example 18 includes the subject matter of any of Examples 16-17, and wherein determining whether the CPU core is overloaded includes determining whether the receive queue length exceeds a first threshold, further wherein the determination that the CPU core is overloaded is based at least in part on a determination that the receive queue length does exceed the first threshold.

Example 19 includes the subject matter of any of Examples 16-18, and wherein determining whether the CPU core is overloaded further includes, responsive to a determination that the receive queue length does not exceed the first threshold, determining whether the receive queue length exceeds a second threshold, further wherein the determination that the CPU core is overloaded is based at least in part on a determination that the receive queue length does exceed the second threshold.

Example 20 includes the subject matter of any of Examples 16-19, and wherein the redirecting is performed probabilistically.

Example 21 includes the subject matter of any of Examples 16-20, and wherein the operations further include repeating the monitoring and determining continuously.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Embodiments of the disclosed technology may be incorporated in various types of architectures. For example, certain embodiments may be implemented as any of or a combination of the following: one or more microchips or integrated circuits interconnected using a motherboard, a graphics and/or video processor, a multicore processor, hardwired logic, software stored by a memory device and executed by a microprocessor, firmware, an application specific integrated circuit (ASIC), and/or a field programmable gate array (FPGA). The term "logic" as used herein may include, by way of example, software, hardware, or any combination thereof.

Although specific embodiments have been illustrated and described herein, it will be appreciated by those of ordinary skill in the art that a wide variety of alternate and/or equivalent implementations may be substituted for the specific embodiments shown and described without departing from the scope of the embodiments of the disclosed technology. This application is intended to cover any adaptations or variations of the embodiments illustrated and described herein. Therefore, it is manifestly intended that embodiments of the disclosed technology be limited only by the following claims and equivalents thereof.

The invention claimed is:

1. A network interface controller (NIC) comprising:
   an interface to receive data packets to be stored in multiple of a plurality of receive queues in the NIC; and
   circuitry to:
      map multiple of the plurality of receive queues to one or more of a plurality of CPU cores communicatively coupled to the NIC;
      monitor a queue length for multiple of the plurality of receive queues; and
      based on (1) a threshold queue length of a first receive queue, (2) key-related application partition information, (3) user configurable CPU core-to-queue mapping data, and (4) CPU core utilization-related out-of-band messaging data, probabilistically redirect the data packets mapped to the first receive queue to another one of the plurality of receive queues to perform dynamic load distribution among the multiple of the plurality of CPU cores;

wherein:

respective of the plurality of CPU cores are to exclusively access, in parallel processing, one or more respective of the plurality of receive queues, based upon the key-related application partition information.

2. The NIC of claim 1, wherein the data packets are connection-oriented data traffic and data packets are redirected for a new flow.

3. The NIC of claim 2, wherein the data packets for the new flow are redirected by Receive Side Scaling.

4. The NIC of claim 2, wherein the data packets for the new flow are redirected by a flow director having programmable filters.

5. The NIC of claim 2, wherein the new flow for a transmission control protocol (TCP) connection is identified by a SYN packet.

6. The NIC of claim 1, wherein the data packets are connectionless data traffic and data packets are redirected by re-configuring a Receive Side Scaling indirection table.

7. The NIC of claim 1, wherein the NIC is an Ethernet card.

8. The NIC of claim 1, wherein the circuitry further to:

select a receive queue from the multiple of the plurality of receive queues associated with respective cores based on a mapping of specific flows to specific receive queues;

if no match is found for a specific flow, select another receive queue from the multiple of the plurality of receive queues based on a hash of packet headers of the data packets; and alter the mapping of specific flows to the specific receive queues based on a length of the specific receive queues to redirect the specific flows to another core.

9. A system to perform data traffic load balancing comprising:

a plurality of CPU cores; and a network interface controller (NIC) communicatively coupled to the NIC, the NIC comprising:

an interface to receive data packets to be stored in multiple of a plurality of receive queues in the NIC; and circuitry to:

map multiple of the plurality of receive queues to one or more of the plurality of CPU cores communicatively coupled to the NIC;

monitor a queue length for multiple of the plurality of receive queues; and based on (1) a threshold queue length of a first receive queue, (2) key-related application partition information, (3) user configurable CPU core-to-queue mapping data, and (4) CPU core utilization-related out-of-band messaging data, probabilistically redirect the data packets mapped to the first receive queue to another one of the plurality of receive queues to perform dynamic load distribution among the plurality of CPU cores;

wherein:

respective of the plurality of CPU cores are to exclusively access, in parallel processing, one or more respective of the plurality of receive queues, based upon the key-related application partition information.

10. The system of claim 9, wherein the data packets are connection-oriented data traffic and data packets are redirected for a new flow.

11. The system of claim 10, wherein the data packets for the new flow are redirected by Receive Side Scaling.

12. The system of claim 10, wherein the data packets for the new flow are redirected by a flow director having programmable filters.

13. The system of claim 10, wherein the new flow for a transmission control protocol (TCP) connection is identified by a SYN packet.

14. The system of claim 9, wherein the data packets are connectionless data traffic and data packets are redirected by re-configuring a Receive Side Scaling indirection table.

15. The system of claim 9, wherein the NIC is an Ethernet card.

16. One or more non-transitory, computer-readable media comprising instructions that, when executed by a network interface controller (NIC), cause the NIC to perform operations pertaining to load balancing in the NIC, the operations comprising:

mapping multiple of a plurality of receive queues in the NIC to one or more of a plurality of CPU cores communicatively coupled to the NIC, the plurality of receive queues to store data packets;

monitoring a queue length for multiple of the plurality of receive queues; and based on (1) a threshold queue length of a first receive queue, (2) key-related application partition information, (3) user configurable CPU core-to-queue mapping data, and (4) CPU core utilization-related out-of-band messaging data, probabilistically redirecting the data packets mapped to the first receive queue to another one of the plurality of receive queues to perform dynamic load distribution among the plurality of CPU cores;

wherein:

respective of the plurality of CPU cores are to exclusively access, in parallel processing, one or more respective of the plurality of receive queues, based upon the key-related application partition information.

17. The one or more non-transitory, computer-readable media of claim 16, wherein the data packets are connection-oriented data traffic and data packets are redirected for a new flow.

18. The one or more non-transitory, computer-readable media of claim 17, wherein the data packets for the new flow are redirected by Receive Side Scaling.

19. The one or more non-transitory, computer-readable media of claim 17, wherein the data packets for the new flow are redirected by a flow director having programmable filters.

20. The one or more non-transitory, computer-readable media of claim 17, wherein the new flow for a transmission control protocol (TCP) connection is identified by a SYN packet.

21. The one or more non-transitory, computer-readable media of claim 16, wherein the data packets are connectionless data traffic and data packets are redirected by re-configuring a Receive Side Scaling indirection table.

22. A network interface controller (NIC), comprising:

an interface to receive data packets to be stored in multiple of a plurality of receive queues in the NIC; and circuitry to:

select a receive queue from the plurality of receive queues associated with respective CPU cores based on a mapping of specific flows to specific receive queues;

if no match is found for a specific flow, select another receive queue from the multiple of the plurality of receive queues based on a hash of packet headers of the data packets; and probabilistically alter the mapping of specific flows to the specific receive queues based on (1) a length of the specific receive queues, (2) key-related application partition information, (3) user configurable CPU core-to-queue mapping data, and (4) CPU core utilization-related out-of-band messaging data;

wherein:

the respective CPU cores are to exclusively access, in parallel processing, one or more respective of the plurality of receive queues, based upon the key-related application partition information.

23. The network interface controller of claim 22, wherein the hash comprises a Receive Side Scaling hash.

24. One or more non-transitory computer-readable media comprising instructions that, when executed by a network interface card (NIC), cause the NIC to perform operations pertaining to load balancing in the NIC, the operations comprising:

selecting a receive queue from a plurality of receive queues in the NIC associated with respective CPU cores based on a mapping of specific flows to specific receive queues;

if no match is found for a specific flow, selecting another receive queue from the multiple of the plurality of receive queues based on a hash of packet headers of a data packet; and altering the mapping of specific flows to the specific receive queues based on (1) a length of the specific receive queues, (2) key-related application partition information, (3) user configurable CPU core-to-queue mapping data, and (4) CPU core utilization-related out-of-band messaging data, to probabilistically redirect the specific flows to another core;

wherein:

the respective CPU cores are to exclusively access, in parallel processing, one or more respective of the plurality of receive queues, based upon the key-related application partition information.

25. One or more non-transitory computer-readable media of claim 24, wherein the hash comprises a Receive Side Scaling hash.

26. A network interface controller (NIC), comprising:

an interface to receive data packets for Key-Value Store workloads to be stored in multiple of a plurality of receive queues in the NIC; and circuitry to:

map multiple of the plurality of receive queues to one or more of a plurality of CPU cores communicatively coupled to the NIC;

monitor a queue length for multiple of the plurality of receive queues; and in response to detection of congestion of one or more of the plurality of CPU cores based on (1) receive queue length, (2) key-related application partition information, (3) user configurable CPU core-to-queue mapping data, and (4) CPU core utilization-related out-of-band messaging data, probabilistically modify a Receive Side Scaling indirection table to point some hash values to receive queues that are serviced by CPU cores having a lighter load;

wherein:

respective of the plurality of CPU cores are to exclusively access, in parallel processing, one or more respective of the plurality of receive queues, based upon the key-related application partition information.

27. The network interface controller (NIC) of claim 26, wherein the hash values comprises a Receive Side Scaling hash.

* * * * *